Figure 3:
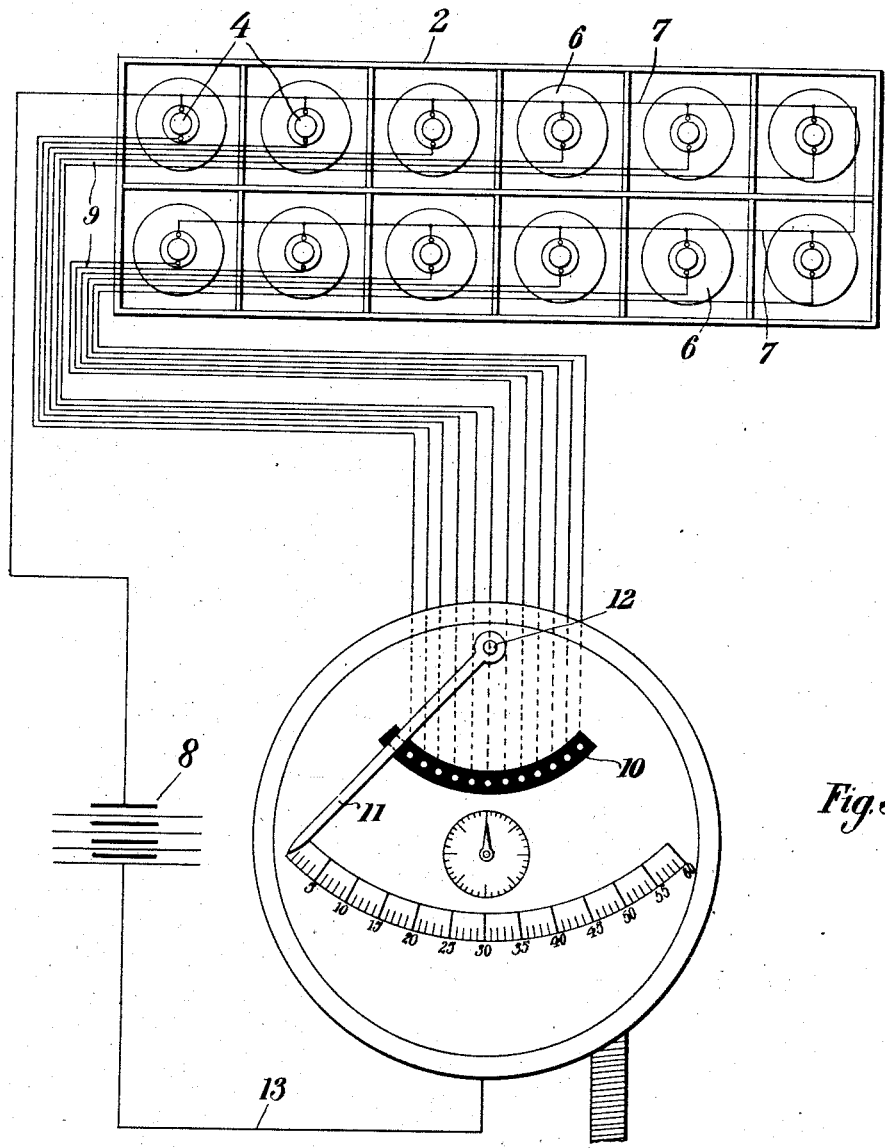

F. L. CANTRALL.
SPEED INDICATOR.
APPLICATION FILED JAN. 21, 1911.
1,042,316.
Patented Oct. 22, 1912.
2 SHEETS—SHEET 1.
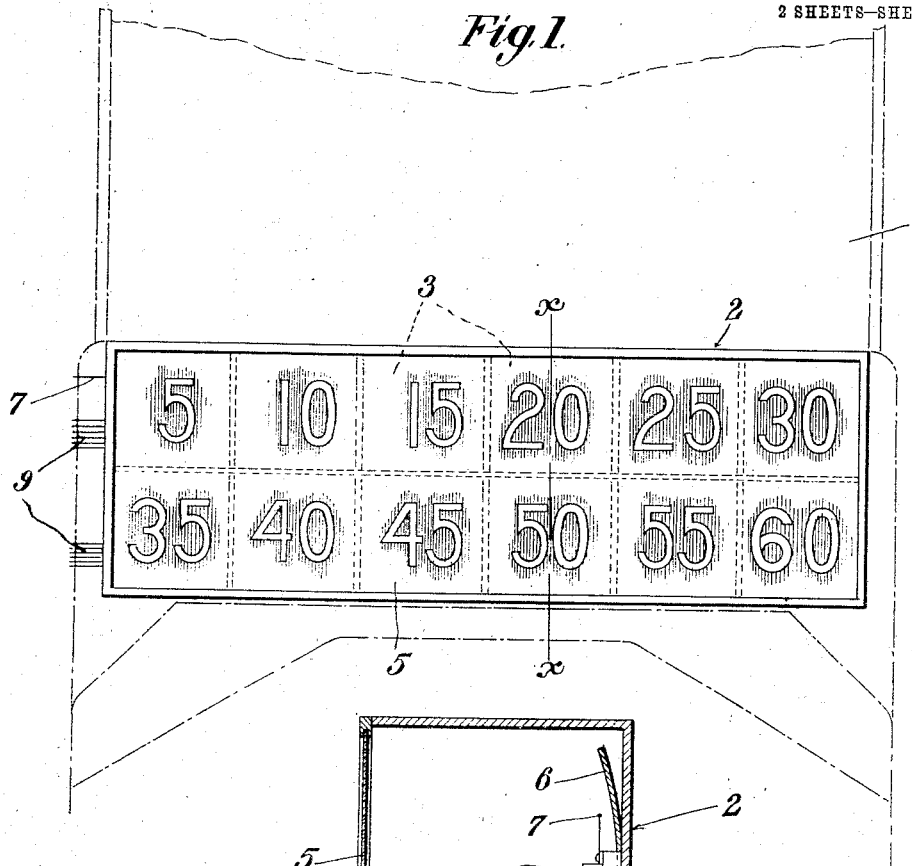
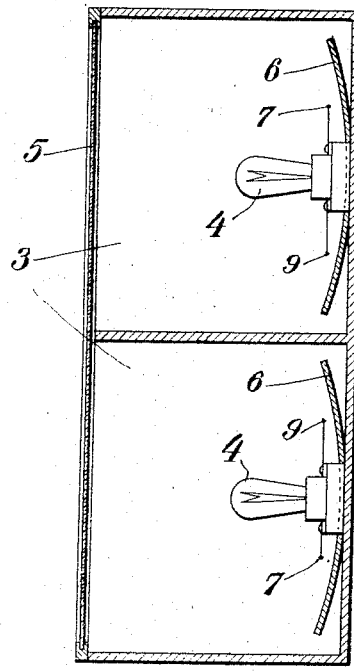
Witnesses
J. H. Crawford
V. B. Hillyard
Inventor
Forest L. Cantrall,
By Victor J. Evans
Attorney

F. L. CANTRALL.
SPEED INDICATOR.
APPLICATION FILED JAN. 21, 1911.

1,042,316.

Patented Oct. 22, 1912.

2 SHEETS—SHEET 2.

Witnesses
J. H. Crawford
V. B. Hillyard

Inventor
Forest L. Cantrall,

By Victor J. Evans
Attorney

UNITED STATES PATENT OFFICE.

FOREST LEE CANTRALL, OF IVY, CALIFORNIA.

SPEED-INDICATOR.

1,042,316.  Specification of Letters Patent.  Patented Oct. 22, 1912.

Application filed January 21, 1911. Serial No. 603,873.

*To all whom it may concern:*

Be it known that I, FOREST LEE CANTRALL, a citizen of the United States, residing at Ivy, in the county of Modoc and State of California, have invented new and useful Improvements in Speed-Indicators, of which the following is a specification.

The present invention provides means for indicating the speed of a vehicle such as an automobile and at the same time to utilize a part of the indicating means as a shield or wind brake, the invention contemplating a series of compartments each containing a lamp and means for establishing an electric circuit to each of the lamps in successive order so that the speed may be determined at a glance, the several circuits being controlled by means of a speedometer or like appliance actuated by the moving vehicle.

A further purpose of the invention is the provision of an indicator which may be read at a distance so that any person may observe the speed of a vehicle from the side walk or other point of vantage, the purpose being to deter persons operating mechanically propelled vehicles from exceeding a lawful speed.

The invention consists of the novel features, details of construction and combination of parts, which hereinafter will be more particularly set forth, illustrated in the accompanying drawings, and pointed out in the appended claim.

Referring to the drawings, forming a part of the specification, Figure 1 is a front view of a speed indicator embodying the invention, the upper part of the wind shield being indicated by dotted lines and the upper portion broken away. Fig. 2 is a transverse section on the line $x$—$x$ of Fig. 1, showing the parts on a larger scale. Fig. 3 is a diagrammatic view, showing the circuits and the speed mechanism for completing the lamp circuits in successive order.

Corresponding and like parts are referred to in the following description, and indicated in all the views of the drawings, by the same reference characters.

The invention contemplates a wind shield embodying an upper panel 1 of glass and a lower section 2, which is subdivided into a plurality of cells or compartments 3, each representing a multiple of five. The manner of designating the cells or compartments may obviously be varied to indicate any number. Each of the compartments or cells 3 has a lamp 4 and the series of compartments are closed by means of a glass plate 5 upon which the numbers appear. A reflector 6 is located in the rear of each of the lamps so as to throw the rays of light through the transparent portions of the glass plate 5 corresponding to the numbers appearing thereon, it being understood that the portion of the plate exterior to the numbers is rendered opaque in any manner either by a coat of paint, varnish or by protective means of any nature applied thereto. The lamps 4 are connected by means of a wire 7 which is connected to one pole of a battery 8 or source of electric energy. A wire 9 connects the other pole of each of the lamps with an electric contact 10. The electric contacts 10 are located in the arc of a circle and are electrically insulated. The hand 11 of the speedometer or other indicating mechanism is pivoted at 12 corresponding to the center of the circle of which the electric contacts 10 form an arc. A wire 13 connects the hand 11 with the other pole of the battery or source of electric supply. The speedometer or indicating mechanism for determining the speed may be of any make or construction and is adapted to be actuated in the usual way and the speed indicating hand thereof is utilized for making and breaking the various electric circuits of the lamps 4. The electric contacts 10 are so arranged that the part of the hand 11 forming the movable contact closes the circuit of the next lamp prior to breaking the circuit of the preceding lamp, so that the approximate speed of a vehicle may be determined. When the hand 11 stands at zero on the scale of the speedometer no one of the lamps 4 is lighted, but when the speed of a vehicle attains a rate of five miles or greater one of the circuits is completed and the corresponding lamp lighted, thereby illuminating the number opposite the cell or compartment containing the lighted lamp. As the speed of the vehicle increases the hand moves away from the zero point and successively closes the lamp circuits, thereby enabling an observer to determine the approximate speed at which the vehicle is moving.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is:—

A speed indicator for a mechanically propelled vehicle comprising a wind shield having a portion formed of a transparent panel and having the remaining portion subdivided into cells or compartments each bearing a number to indicate the speed, electric lamps arranged within the cells or compartments for illuminating the same and the numbers thereof, a plurality of electric conductors in parallel one for each lamp of the cells or compartments, a circuit closer comprising a movable contact and a series of fixed contacts each in series with a lamp, and a speed indicating mechanism having the movable contact connected therewith, whereby the lamp circuits are successively closed as the speed of the vehicle increases.

In testimony whereof I affix my signature in presence of two witnesses.

FOREST LEE CANTRALL.

Witnesses:
J. C. RACHFORD,
BENJAMIN LAUER.